US012754149B2

(12) United States Patent
Huang et al.

(10) Patent No.: US 12,754,149 B2
(45) Date of Patent: Oct. 6, 2026

(54) ATTITUDE ADJUSTMENT STRUCTURE, CONVEYING DEVICE, RADIATION IMAGING SYSTEM

(71) Applicant: NUCTECH COMPANY LIMITED, Beijing (CN)

(72) Inventors: Qingping Huang, Beijing (CN); Mingzhi Hong, Beijing (CN); Li Zhang, Beijing (CN); Zhiqiang Chen, Beijing (CN); Yuanjing Li, Beijing (CN); Guipei Li, Beijing (CN); Jianxue Yang, Beijing (CN); Liguo Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 204 days.

(21) Appl. No.: 18/697,918

(22) PCT Filed: Oct. 8, 2022

(86) PCT No.: PCT/CN2022/123830
§ 371 (c)(1),
(2) Date: Apr. 2, 2024

(87) PCT Pub. No.: WO2023/056939
PCT Pub. Date: Apr. 13, 2023

(65) Prior Publication Data

US 2024/0410837 A1 Dec. 12, 2024

(30) Foreign Application Priority Data

Oct. 8, 2021 (CN) .......................... 202111173756.2
Dec. 31, 2021 (CN) .......................... 202111670901.8

(51) Int. Cl.
*G01N 23/046* (2018.01)

(52) U.S. Cl.
CPC ....... *G01N 23/046* (2013.01); *G01N 2223/32* (2013.01); *G01N 2223/321* (2013.01);
(Continued)

(58) Field of Classification Search
CPC ............. G01N 23/046; G01N 2223/32; G01N 2223/321
See application file for complete search history.

(56) References Cited

U.S. PATENT DOCUMENTS

2008/0165916 A1 7/2008 Stanton et al.
2019/0304127 A1* 10/2019 Kashu .................. G06T 7/0004

FOREIGN PATENT DOCUMENTS

CN 105522548 A 4/2016
CN 107515229 A 12/2017
(Continued)

OTHER PUBLICATIONS

Extended European Search Report received in EP Application No. EP 22826791 as mailed Jul. 7, 2025 in 8 pages.
(Continued)

*Primary Examiner* — Hugh Maupin
(74) *Attorney, Agent, or Firm* — Knobbe, Martens, Olson & Bear, LLP

(57) ABSTRACT

The present disclosure relates to a field of detection apparatus technology, and in particular, to an attitude adjustment structure, a conveying device, and a radiation imaging system. An attitude adjustment structure includes: a base body, arranged in an X direction, the base body having a bearing surface, and the bearing surface being configured to place a detected object; a first adjustment assembly, arranged on the base body and configured to drive the detected object to deviate around a Y direction on the bearing surface and drive the detected object to move in the X direction; and at least one second adjustment assembly, arranged on the base
(Continued)

body and configured to drive the detected object to rotate around a Z direction.

17 Claims, 9 Drawing Sheets

(52) U.S. Cl.
CPC ................ *G01N 2223/3306* (2013.01); *G01N 2223/3307* (2013.01)

(56) References Cited

FOREIGN PATENT DOCUMENTS

| | | | |
|---|---|---|---|
| CN | 109545905 | A | 3/2019 |
| CN | 209382842 | U | 9/2019 |
| CN | 210557416 | U | 5/2020 |
| CN | 112141724 | A | 12/2020 |
| CN | 113030131 | A | 6/2021 |
| JP | 2005-121633 | A | 5/2005 |
| JP | 2009-109229 | A | 5/2009 |
| JP | 2013-224846 | A | 10/2013 |
| JP | 2016-070909 | A | 5/2016 |
| JP | 2016-533481 | A | 10/2016 |
| KR | 101272556 | B1 | 6/2013 |
| KR | 10-2020-0088222 | A | 7/2020 |
| KR | 102216872 | B1 | 2/2021 |
| KR | 102288818 | B1 | 8/2021 |
| WO | WO 2009/078415 | A1 | 6/2009 |

OTHER PUBLICATIONS

Chinese Office Action received in Chinese Patent Application No. 202111670901.8 as mailed Oct. 28, 2023 in 9 pages.
Japanese Office Action received in Japanese Patent Application No. 2022-580906 as mailed Feb. 6, 2024 in 12 pages, with English translation.
Japanese Office Action received in Japanese Paten Application No. 2022-580906 as mailed Jun. 25, 2024 in 6 pages, with English translation.
International Search Report and Written Opinion received in PCT Application No. PCT/CN2022/123830 as mailed Dec. 15, 2022, with English translation, in 10 pages.

* cited by examiner

ATTITUDE ADJUSTMENT STRUCTURE, CONVEYING DEVICE, RADIATION IMAGING SYSTEM

CROSS REFERENCE TO RELATED APPLICATION

This application is a Section 371 National Stage Application of International Application No. PCT/CN2022/123830, filed on Oct. 8, 2022, entitled "ATTITUDE ADJUSTMENT STRUCTURE, CONVEYING DEVICE, RADIATION IMAGING SYSTEM", which claims priority to Chinese Application No. 202111173756.2 filed on Oct. 8, 2021 and Chinese Application No. 202111670901.8 filed on Dec. 31, 2021, the entire content of which is incorporated herein by reference in its entirety.

TECHNICAL FIELD

The present disclosure relates to a field of detection apparatus technology, and in particular, to an attitude adjustment structure, a conveying device, and a radiation imaging system.

BACKGROUND

Radiation imaging is a technology to observe an inside of an object using rays. Such technology may obtain information such as the structure and density of the inside of the object without destroying the object, and is currently widely used in scenarios such as chest X-rays in hospitals and security inspections in stations and airports. However, when a detected object is a thin film or an adhesive layer, in order to ensure the accuracy of detection, it is necessary that a main beam plane of a light beam generated by a ray machine in a radiation imaging system be parallel to a detected layer of the detected object.

SUMMARY

With this regard, according to the present disclosure, there is provided an attitude adjustment structure, a conveying device, and a radiation imaging system.

According to an aspect of the present disclosure, there is provided an attitude adjustment structure, including: a base body, arranged in an X direction, the base body having a bearing surface, and the bearing surface being configured to place a detected object; a first adjustment assembly, arranged on the base body and configured to drive the detected object to deviate around a Y direction on the bearing surface and drive the detected object to move in the X direction; and at least one second adjustment assembly, arranged on the base body and configured to drive the detected object to rotate around a Z direction.

According to an embodiment of the present disclosure, the first adjustment assembly includes: a rack, slidable in the X direction relative to the base body; and a rotating member, rotatably arranged on the rack with the Y axis as a rotation axis and configured to drive the detected object to deviate around the Y direction on the bearing surface under a driving of an external force, and drive the detected object to move in the X direction under a driving of the rack.

According to an embodiment of the present disclosure, the rotating member includes: a turning lever, rotatably arranged on the rack with the Y axis as a rotation axis; and a turning head, arranged on the turning lever and allowed to abut against the detected object under a driving of the driving rod.

According to an embodiment of the present disclosure, the rack is provided with a rotating shaft protruding in the Y direction, and the first adjustment assembly further includes: an adapter block rotatably arranged on the rotating shaft, the driving lever being fixed on the adapter block.

According to an embodiment of the present disclosure, the first adjustment assembly further includes: at least one first driving unit, arranged on the rack, the first driving unit having a pushing rod movable toward or away from the adapter block, wherein, the pushing rod is movably connected to an end of the adapter block away from the rotating shaft.

According to an embodiment of the present disclosure, the first driving unit further includes: a first motor, arranged on the rack, an end of the pushing rod is connected to a motor shaft of the first motor; wherein an end of the pushing rod close to the adapter block is provided with a threaded section, and the adapter block is provided with a thread sleeve matched with the threaded section.

According to an embodiment of the present disclosure, at least one of the turning head is rotatably arranged on the turning lever and is configured as an eccentric structure, wherein, the turning head has a first position protruding from the bearing surface under a driving of an eccentric force and a second position turned below the bearing surface under an action of an external force; and when the rack moves in the X direction, the turning head at the first position is configured to push the detected object to move in the X direction.

According to an embodiment of the present disclosure, the turning head has: a pushing surface configured to abut against the detected object; a guiding surface, arranged at an angle to the pushing surface and configured to receive an external force; a limiting structure, configured to limit a rotation of the turning heat when the turning head moves to the first position; wherein, when the rack moves in a negative direction of the X axis, the guiding surface hits the detected object to drive the turning head to move to the second position.

According to an embodiment of the present disclosure, the attitude adjustment structure further includes: a balancing weight, arranged on the turning head and configured to adjust an eccentric distance of the turning head, so that the pushing surface is parallel to a YZ plane at the first position.

According to an embodiment of the present disclosure, in the X direction, a plurality of the turning heads are rotatably arranged on the rack, and the plurality of the turning heads are arranged at intervals, so as to push the detected object on the base body to move toward a detection region.

According to an embodiment of the present disclosure, a sliding rail-sliding block structure is arranged between the rack and the base body.

According to an embodiment of the present disclosure, the detected object is conveyed to the second adjustment assembly under a driving of the first adjustment assembly, and wherein the second adjustment assembly includes: a supporting plate, rotatably arranged on the base body with the Z axis as a rotation axis and configured to bear the detected object thereon.

According to an embodiment of the present disclosure, an end of the supporting plate close to the first adjustment assembly is hinged on the base body, and the second adjustment assembly further includes: a second driving unit, arranged on the base body and disposed below the supporting plate away from a hinged end to drive the supporting plate to rotate.

According to an embodiment of the present disclosure, the second driving unit includes: a second motor, arranged on the base body; and a lifting rod, arranged on a motor shaft of the second motor with an end of the lifting rod being connected to the supporting plate.

According to an embodiment of the present disclosure, two second adjustment assemblies are arranged in the X direction at an interval, and a ray for detecting the detected object passes through a middle of the interval.

According to another aspect of the present disclosure, there is provided a conveying device, including: the attitude adjustment structure according to any one of the above descriptions.

According to another aspect of the present disclosure, there is provided a radiation imaging system, including: the conveying device described above, and a scanning device, arranged on two sides of a second adjustment assembly and configured to scan a detected object placed on the second adjustment assembly.

BRIEF DESCRIPTION OF THE DRAWINGS

The above and other objectives, features and advantages of the present disclosure will be more clearly described through the following description of the embodiments of the present disclosure with reference to the accompanying drawings, in which.

Figure 1:
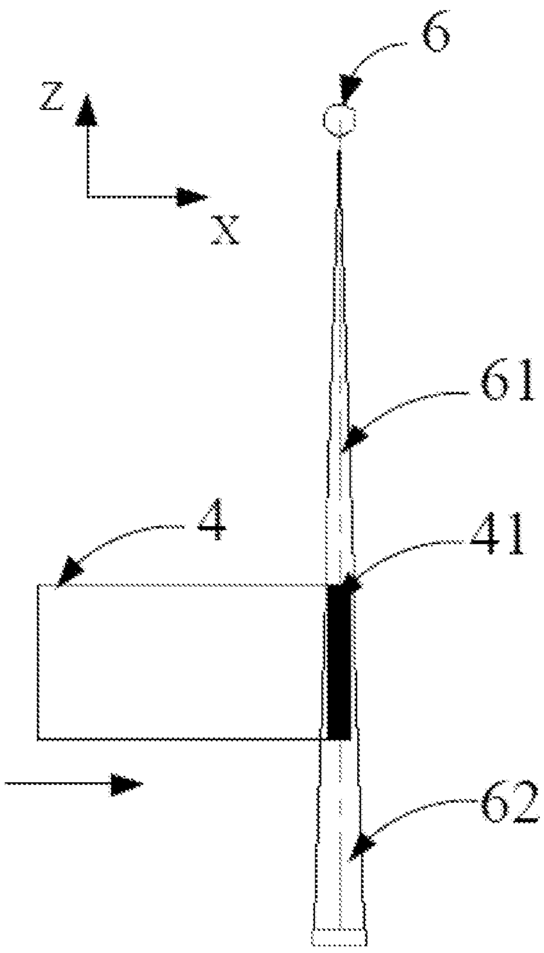
FIG. 1 schematically shows a simple diagram of a principle of a radiation imaging according to an embodiment of the present disclosure.

EXPLANATION OF REFERENCE SIGNS 1. base body; 11—bearing surface; 12—frame body; 13—supporting rail;
2. first adjustment assembly; 21—rack; 22—turning lever; 23—turning head; 24—bearing; 25—adapter block; 26—first driving unit; 27—retaining ring; 231—balancing weight; 232—pushing surface; 233—guiding surface; 234—limiting structure; 211—rotating shaft; 251—thread sleeve; 261—pushing rod; 262—first motor;
3. second adjustment assembly; 31—supporting plate; 32—second driving unit; 321—second motor; 322—lifting rod; 33—hinge seat; 34—joint;
4. detected object; 41—detected layer;
5. sliding rail and sliding block structure; 51—sliding block; 52—sliding rail;
6. ray machine; 61—main beam surface; 62—scanning region;
7. scanning device.

DETAILED DESCRIPTION OF EMBODIMENTS

Hereinafter, the embodiments of the present disclosure will be described with reference to the accompanying drawings. However, it should be understood that these descriptions are exemplary only, and are not intended to limit the scope of the present disclosure. In the following detailed description, for the purpose of explanation, numerous specific details are set forth in order to provide a thorough understanding of the embodiments of the present disclosure. It may be evident, however, that one or more embodiments may be implemented without these specific details. Additionally, in the following description, descriptions of commonly known structures and technologies are omitted to avoid unnecessarily obscuring the concept of the present disclosure.

The terms used herein are for the purpose of describing particular embodiments only, and are not intended to limit the present disclosure. The terms such as “comprise”/“include” and “contain” used herein indicate a presence of the feature, step, operation and/or component, but do not exclude a presence or an addition of one or more other features, steps, operations or components.

When an expression such as “at least one of A, B, or C” is used, it should generally be interpreted according to the meaning commonly understood by those skilled in the art (for example, an expression “a system having at least one of A, B, or C” should include, but not be limited to, a system only having A, a system only having B, a system only having C, a system having A and B, a system having A and C, a system having B and C, and/or a system having A, B and C). The terms “first” and “second” are only used for descriptive purposes, and may not be understood as indicating or implying a relative importance or implicitly specifying a quantity of an indicated technical feature. Therefore, a feature defined as "first" or "second" may explicitly or implicitly include one or more of said features.

A detailed background technology may include other technical problems other than the technical problems to be solved by independent claims.

According to an embodiment of the present disclosure, there is provided an attitude adjustment structure including: a base body, arranged in an X direction, the base body having a bearing surface, and the bearing surface being configured to place a detected object; and a first adjustment assembly, arranged below the base body, wherein the first adjustment assembly includes: a rack, slidable in the X direction relative to the base body; a turning lever, rotatably arranged on the rack with the Y axis as a rotation axis; and a turning head, arranged on the turning lever and allowed to abut against the detected object under a driving of the driving rod to drive the detected object to deviate around a Y direction on the bearing surface, and/or drive the detected object to move in the X direction on the bearing surface.

The attitude adjustment structure of the present disclosure may be used to adjust a movement attitude of an object conveyed on a production line; it may also be used in the field of radiation detection to adjust a detected object to a preset detection position. In the application of the field of radiation detection, the attitude adjustment structure in the present disclosure needs to be used in at least the following scenarios. The scenarios are described as follows:

It may be understood that in the field of radiation detection, the radiation imaging technology may perform an imaging on a damage of an internal portion of an object to facilitate judgment by an inspector. In the detected objects, there are regions to be detected having a small detection dimension. For example, in a detection process of a lithium battery, a thin film or an adhesive layer of the lithium battery needs to be detected. But a thickness of the thin film or the adhesive layer of the lithium battery is small. As shown in FIG. 1, a black region represented by 41 in the figure is the film or the adhesive layer mentioned above, an axis parallel to the main beam surface 61 is defined as the Z axis, an axis parallel to an advancing direction of the detected object 4 is defined as the X axis, and a Y axis is defined to be perpendicular to both of the X axis and the Z axis. An imaging region 62 constituted by rays emitted by a ray machine 6 is approximately of a cone shaped. In the actual detection, the inventors found that when a detected layer (a detection surface parallel to the main beam surface) of the film or the adhesive layer is deviated in the Z direction or the Y direction, due to the influence of the shape of the imaging region, there may be situation that the detected layer is deviated out of the imaging region, and when the detected layer is deviated out of the imaging region, a portion of the detected layer may not be detected, resulting in a problem of detection inaccuracy.

Based on the above problems, as shown in FIG. 2 to FIG. 13, FIG. 15 and FIG. 16, the specific implementation manners of the attitude adjustment structure in the embodiments of the present disclosure are shown.

The attitude adjustment structure in the embodiments of the present disclosure includes a base body 1, a first adjustment assembly 2, and a second adjustment assembly 3. The detected object 4 is placed on the base body 1, and the first adjustment assembly 2 is used to adjust a deviate of the detected object 4 around the Y direction on the base body 1, i.e., a direction indicated by a two-way arrow in FIG. 3.

Figure 4:
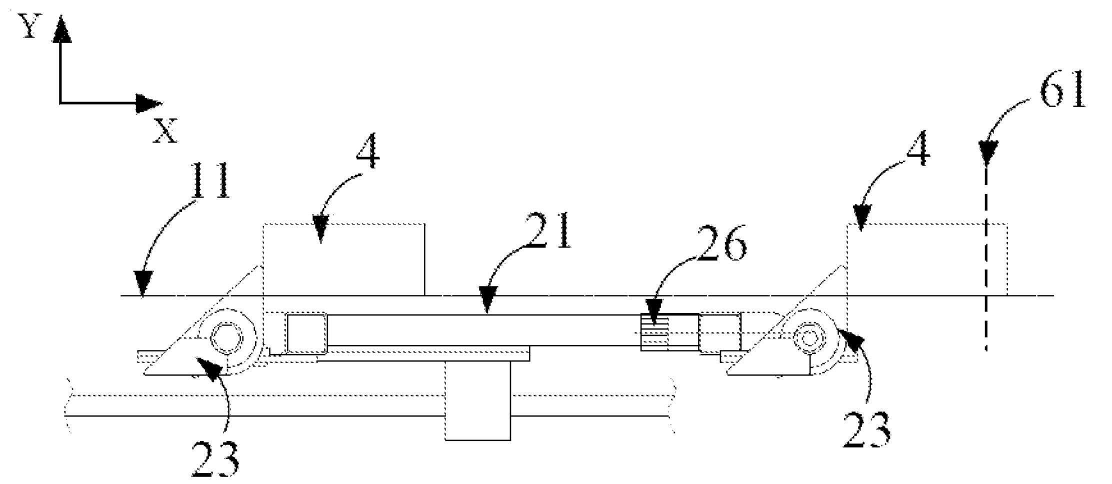
FIG. 4 schematically shows a front view of a first adjustment assembly according to an embodiment of the present disclosure.

Referring to FIG. 4, the base body 1 in the embodiments of the present disclosure is arranged in the X direction. A plurality of detected objects 4 may be placed on the base body 1 at intervals. The base body 1 may be a common production conveying line, for example, a production console, a placement assembly line, and the like.

Figure 10:
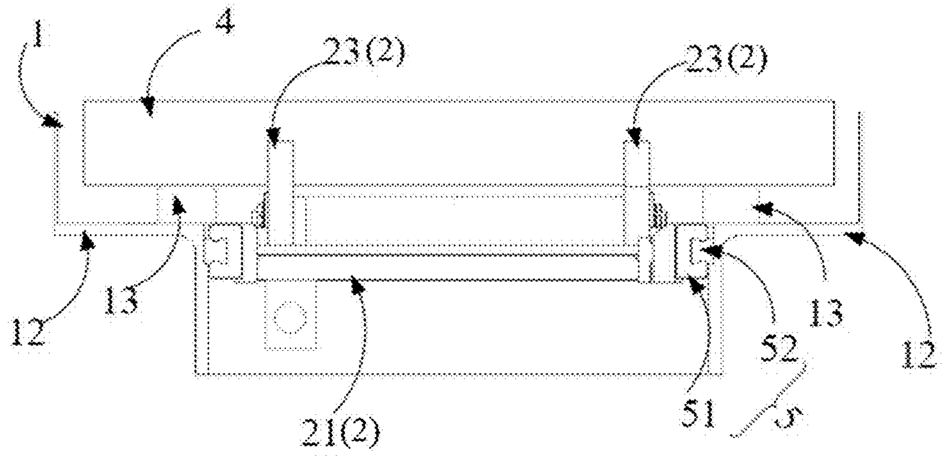
FIG. 10 schematically shows a side view of a first adjustment assembly according to an embodiment of the present disclosure.

As shown in FIG. 10, the base body 1 is designed to be a supporting frame of an assembly line style, including two frame bodies 12 arranged opposite to each other, and the first adjustment assembly 2 is arranged between the two frame bodies 12. A cross-section shape of the two frame bodies 12 is L-shaped, and therefore it includes a horizontal supporting arm and a vertical supporting arm. A supporting rail 13 is mounted on the horizontal supporting arm, and an upper surface of the supporting rail 13 is configured to be the bearing surface 11. The detected object 4 spans the two supporting rails 13 and is supported by the bearing surfaces 11 of the support rails 13 to achieve a function of placing the detected object 4.

The detected object 4 in the embodiments of the present disclosure may be a lithium battery. When the lithium battery is placed on the bearing surface 11, it is necessary to ensure that a plane where a thickness of an adhesive layer or a film layer thereof is located is substantially arranged to face the ray machine of the imaging system.

FIG. 4 to FIG. 10 show the specific structure of the first adjustment assembly 2.

Referring to FIG. 10, the first adjustment assembly 2 includes a rack 21, and the rack 21 is movably arranged on the base body 1 and is slidable relative to the base body 1. As shown in FIG. 10, the rack 21 is a square frame body structure, sliding blocks 51 are respectively mounted on two frame edges thereof arranged opposite to each other, a sliding rail 52 is mounted on an inner side of a vertical wall of the frame body 12 of the base body 1, and the sliding blocks 51 are slidably arranged on the sliding rail 52, so that the rack 21 moves relative to the base body 1 in the X direction under a driving of an external force.

It may be understood that, in some implementation manners, the sliding blocks 52 may also be mounted on the rack 21, and the sliding rail 51 may be mounted on the base body 1.

It may be understood that driving of an external force may be a manpower driving, an electric driving, a hydraulic driving, a pneumatic driving and the like.

In the embodiment of the present disclosure, the first adjustment assembly 2 further includes a rotating member. The rotating member is rotatably arranged on the rack 21 with the Y axis as a rotation axis and used to drive the detected object to deviate around the Y direction on the bearing surface under a driving of an external force, and drive the detected object to move in the X direction under a leading of the rack 21.

Figure 5:
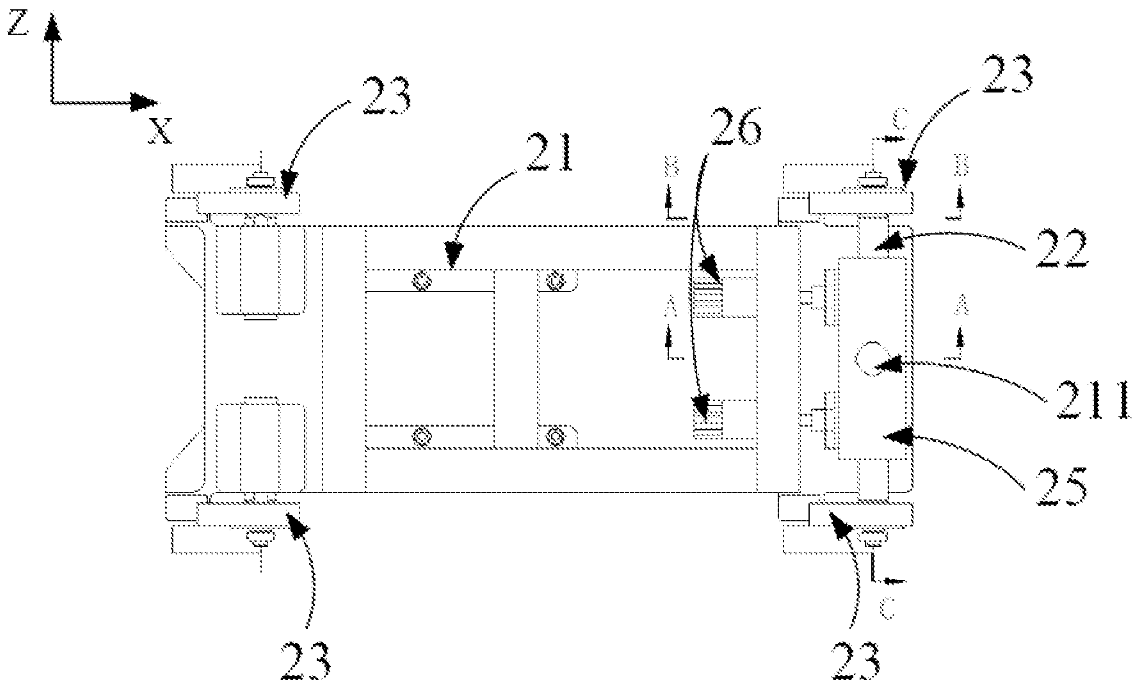
FIG. 5 schematically shows a top view of a first adjustment assembly according to an embodiment of the present disclosure.
Figure 9:
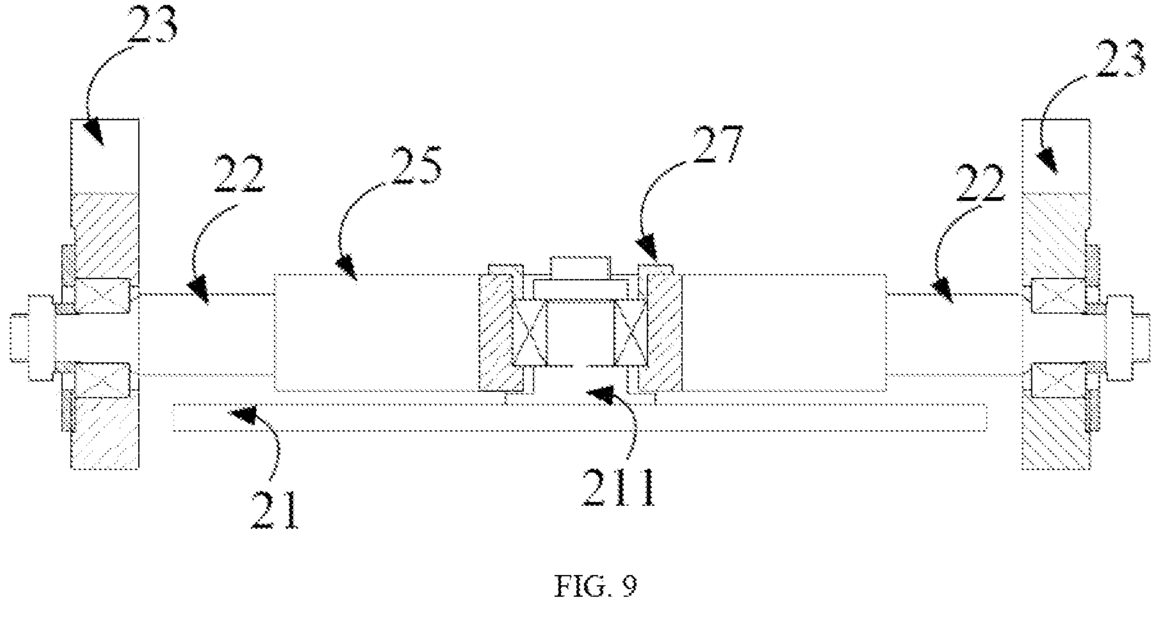
FIG. 9 schematically shows a cross-sectional view at C-C in FIG. 5.

It may be understood that there may be various structures and forms of the rotating member. The rotating member in the embodiments of the present disclosure is in a form of a combination of a turning lever and a turning head, and the specific structure is as follows:

As shown in FIG. 5, a turning lever 22 is mounted on the rack 21, and the turning lever 22 is rotatably arranged on the rack 21 with the Y axis as a rotation axis. Referring to FIG. 9, on the rack 21, a rotating shaft 211 is arranged in the Y direction, and the rotating shaft 211 is fixed on the rack 21. Further, the rack 21 has a border transversely arranged between the frame bodies 12, and the rotating shaft 211 is arranged at a center of an upper end surface of the border described above, and the setting at the center may ensure that lengths of rotating arms of the turning lever 22 arranged on the rotating shaft 211 are consistent, thereby facilitating a subsequent adjustment of a deviate angle.

It may be understood that, in order that the turning lever 22 may be rotatably mounted on the rotating shaft 211, in the embodiments of the present disclosure, the turning lever 22 is arranged on an adapter block 25, and two turning levers 22 are respectively arranged on the adapter block 23 opposite to each other. An mounting hole is processed at a middle position of the adapter block 25, and the mounting hole is embedded with a bearing and a retaining ring 27 for restricting the bearing from coming out of the mounting hole. The rotating shaft 211 is matched and mounted in the bearing, so as to achieve a rotation of the adapter block 25 around the rotating shaft 211 and lead a rotation of the turning lever 22 around the Y direction.

As shown in FIG. 4, the first adjustment assembly 2 in the embodiments of the present disclosure further includes a turning head 23, and the turning head 23 is arranged on the turning lever 22. The turning head 23 may abut against the detected object 4 under a driving of the turning lever 22, so as to drive the detected object 4 to deviate around the Y direction on the bearing surface 11 and to drive the detected object to move in the X direction on the bearing surface.

In the embodiments of the present disclosure, the turning heads 23 are respectively mounted at ends of the two turning levers 22. The turning heads 23 protrude from the bearing surface 11, and may abut against an end face of the detected object 4 in a direction of a backward movement when the rack 21 moves. Moreover, in order to achieve a deviate of the detected object 4, an abutment position of the turning head 23 deviates from a central position of the end surface.

It may be understood that the process of driving the detected object 4 on the bearing surface 11 to deviate around the Y direction by the turning head 23 is as follows. When the rack 21 moves to the detected object 4 driven under a driving of external force, if a deviate of the detected object in the Y direction is deviated, the adapter block 25 rotates, and leads the turning lever 22 to rotate, so that the turning head 23 on the turning lever 22 acts on the detected object 4 and the turning head 23 pushes the detected object 4 to rotate, thereby achieving a correction of the deviate of the detected object 4. The detection method of whether the detected object 4 has deviated in the Y direction may be detected by a position sensor to detect spatial position coordinates of a current detected object 4 to determine whether it has deviated. It may also be determined by a detection result of a previous detected object 4. If the detection result of the previous detected object 4 is an occurrence of deviating, then a deviating adjustment needs to be performed on the current detected object 4.

It may be understood that after the deviate correction of the detected object 4 is completed, when the rack 21 continues to move in the X direction, the turning head 23 may push the detected object 4 to move in the X direction to enter the next detection step.

It may be understood that, in some embodiments, under a driving of the turning lever 22, the turning head 23 may only abut against the detected object 4 to drive the detected object 4 to deviate around the Y direction on the bearing surface 11. The movement of the detected object 4 in the X direction may be driven by other structures.

It may be understood that, in some embodiments, the rotating member may also be a combination of a turntable and a lifting structure. Specifically, the turntable is arranged on the lifting structure. Under a leading of the lifting structure, the turntable 21 may move up and down in the Y direction. When the turntable 21 rises, it may bear the detected object 4 on the base body 1. At the same time, the turntable is rotatably arranged on the lifting structure. Under a driving of an external force, the turntable bearing the detected object 4 may rotate around the Y direction. Further, the lifting structure is fixed on the rack 1, and under a leading of the rack 1, the turntable may also move in the X direction, so as to achieve an adjustment of the deviate of the detected object in the Y direction.

In the embodiments of the present disclosure, the first adjustment assembly 2 further includes a first driving unit 26, where the first driving unit 26 is used to push a rotation of the adapter block 25, and specifically, the first driving unit 26 has a pushing rod 261 that may move toward or away from the adapter block 25, and a first motor 262. An end of the pushing rod 261 is movably connected to the adapter block 25, and the other end thereof is connected to the first motor 262. In order to ensure that the pushing rod 261 may push the adapter block 25 to rotate around the rotating shaft 211, the push rod 261 needs to be connected to an end of the adapter block 25 away from the rotating shaft 211 to form a rotational moment during pushing.

Figure 6:
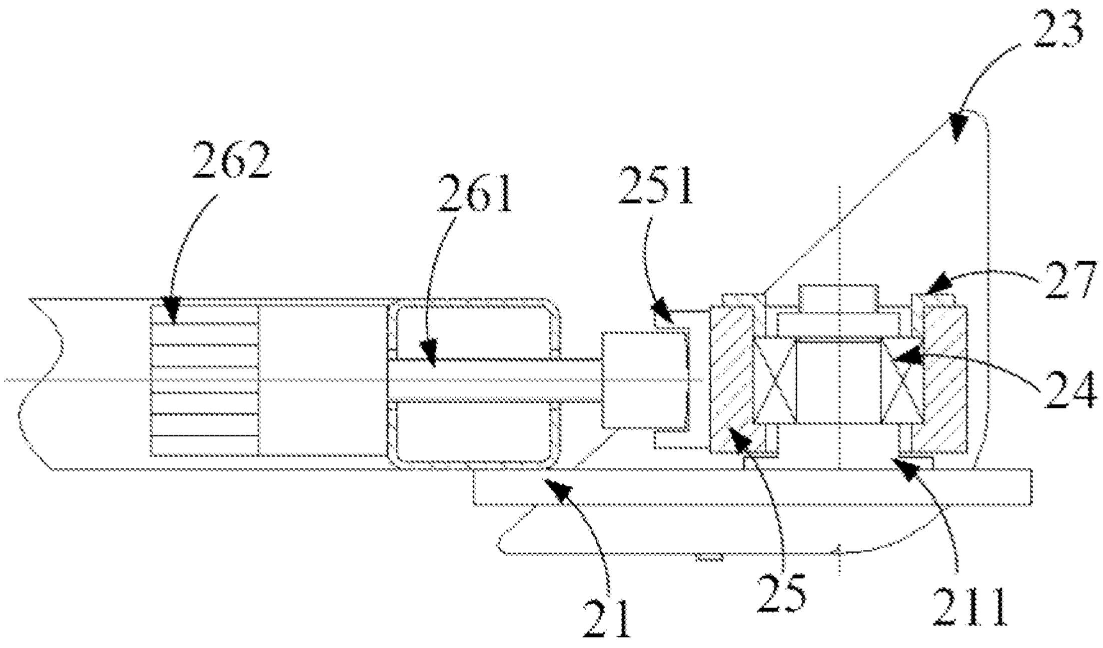
FIG. 6 schematically shows a cross-sectional view at A-A in FIG. 5.

Referring to FIG. 6, the first motor 262 is arranged on the rack 21, and a rotation of the first motor 262 leads the pushing rod 261 to rotate. A thread sleeve 251 is mounted on an end face of the adapter block 25 towards the pushing rod 261, and the pushing rod 261 is provided with a threaded section cooperating with the thread sleeve 251. When the pushing rod 261 rotates, the threaded section rotates within the thread sleeve 251 to drive the adapter block 25 to rotate.

It may be understood that two sets of first driving units 26 are provided in the embodiments of the present disclosure, and they are arranged symmetrically with respect to the rotating shaft 211. When the two sets of first driving units 26 drive the turning lever 26 to move, a pushing rod 261 of one first driving unit 26 moves towards the turning lever 26, and the pushing rod 261 of the other first driving unit 26 moves away from the turning rod 26.

It may be understood that in some other embodiments, the quantity of the first driving unit 26 may be one set. When one set of the first driving unit 26 is provided, the pushing rod 261 and the adapter block 25 may be adjusted through a cooperation of a telescopic rod with a universal joint to achieve a reciprocating swing of the turning lever 22 around the Y direction.

It may be understood that, in some implementation manners, the quantity of the turning heads 23 mounted on the turning lever 22 may be multiple, so as to adjust a position of turning.

As described above, in the embodiments of the present disclosure, when the rack 21 moves, it has a function of pushing the detected objects 4 to move in the X direction through the turning head 23, and the detected objects 4 are arranged on the base body 1 at intervals. When the rack 21 drives a previous detected object 4 to move to the next process in the X direction, the rack 21 may be driven back, and the turning head 23 is allowed to abut against the end face of the detected object 4 in a direction of a backward movement again, so as to push the detected object 4 to move in the X direction. In order to achieve a continuous conveying of the detected object 4 on the base body 1 by the first adjustment assembly 2, in the embodiments of the present disclosure, the turning head 23 is also needed to be rotatably arranged on the turning lever 22, rotatable around an axis direction of the turning lever 22, and configured as an eccentric structure. The turning head 23 has a first position protruding from the bearing surface 11 under a driving of an eccentric force and a second position turned below the bearing surface under an action of an external force. When the rack 21 moves in the X direction, the turning head 23 at the first position is used to push the detected object to move in the X direction.

Figure 7:
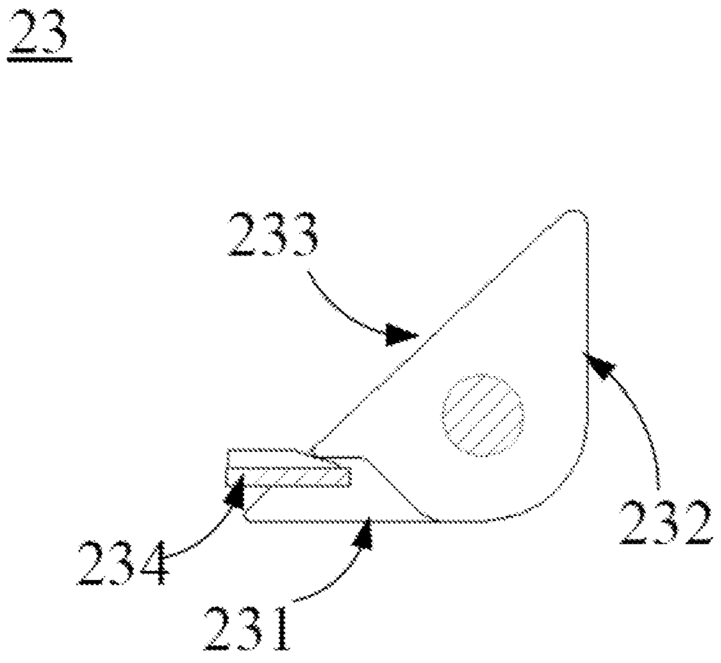
FIG. 7 schematically shows a cross-sectional view at B-B in FIG. 5.
Figure 8:
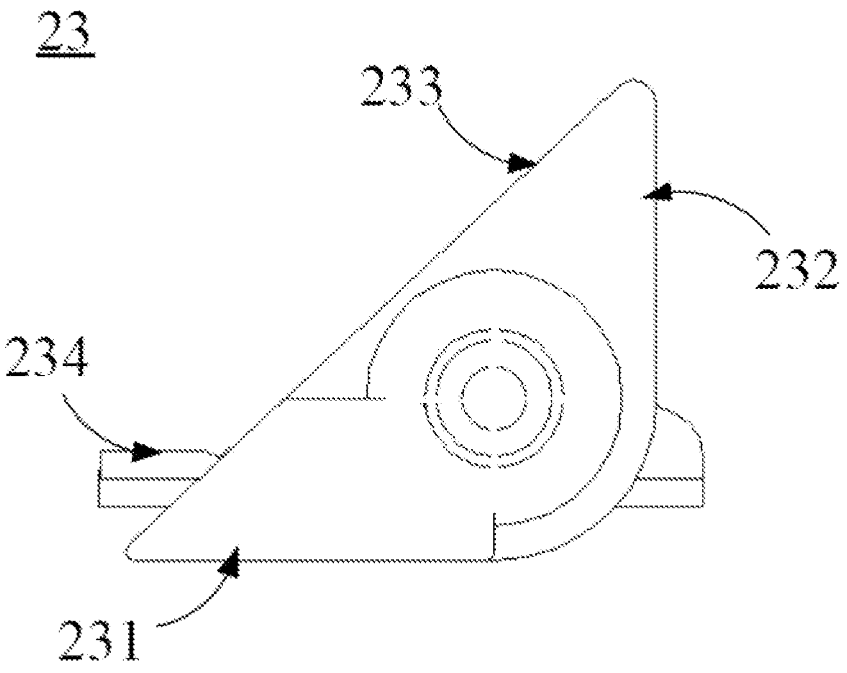
FIG. 8 schematically shows a schematic structural diagram of a turning head according to an embodiment of the present disclosure.

As shown in FIG. 7 and FIG. 8, the turning head 23 has: a pushing surface 232 configured to abut against the detected object; a guiding surface 233 provided at an angle to the pushing surface 232 and configured to receive an external force. The turning head 23 in the present embodiment is in a shape of a right triangle, the pushing surface 232 described above corresponds to a plane where the right angle sides are located, and the guiding surface 233 corresponds to a plane where the beveled side is located. A limiting structure 234 is used to limit a rotation of the turning head 23 when the turning head 23 moves to the first position, wherein when the rack 21 moves in a negative direction in the X axis, the guiding surface 233 hits on the detected object to drive the turning head 23 to move to the second position. Referring to FIG. 7, the limiting structure 234 is a limiting block arranged at the guiding surface 233 and protruding from the guiding surface 233. With the mounting manner of the turning head 23 in FIG. 4, the turning head 23 is led under an action of an eccentric force to rotate counterclockwise on the turning lever 22, when rotating to a preset position, the limiting structure 234 is blocked by a limiting portion on the rack 21, and may not continue to rotate, the position here is the first position, and in the first position, the turning head may not rotate counterclockwise. When the rack 21 advances in the X direction, the pushing surface 232 abuts against the detected object 4, and a reverse force exerted by the detected object 4 will not drive the turning head 23 to rotate counterclockwise, so that the turning head 23 may push the detected object 4 to move in the X direction. When the rack 21 moves in the negative direction of X, i.e., when it moves backwards, the guiding surface 233 will preferentially hit a detected object 4 at the rear, and under an action of the impact force, the turning head 23 will rotate clockwise. In the moving process, the turning head 23 is gradually pressed down by the detected object 4 to a lower portion of the bearing surface 11, the position here is the second position, until having slid over the detected object 4, the turning head 23 returns to the first position again under an action of an eccentric force, the pushing surface 232 is again located on the end face of the detected object 4 in a direction of a backward movement, at this time, the rack 21 is driven to move forward in the X direction, and the turning head 23 continues to push the detected object 4 to move in the X direction to enter the next process. The above steps are repeated to achieve conveying of the detected object 4.

As shown in FIG. 8, in order to ensure that the center of the turning head 23 does not coincide with the center of rotation, a balancing block is provided on the turning head 23 to adjust an eccentric distance of the turning head 23, so that the pushing surface 232 is parallel to the YZ plane at the first position. A parallel setting of the pushing surface 232 and the YZ plane may ensure that when the pushing surface 232 pushes the detected object 4, the pushing surface 232 fits on the detected object 4, thereby ensuring a smooth movement of the detected object 4 on the bearing surface 11.

In the embodiments of the present disclosure, a material incoming manner of the detected object 4 is that one detected object is conveyed from a material incoming point of the base body 1 every certain time interval. However, the distance between the material incoming point of the detected object 4 and the imaging region is relatively long, as a result, a travel of the rack 21 moving forward or backward between the material incoming point and the imaging region is relatively long, and this increases a conveying time of the detected object 4. In order to solve the above problem, in the embodiments of the present disclosure, a turning head 23 is rotatably arranged at an end of the rack 21 away from the first adjustment assembly 2, and the turning head 23 and the turning head in the first assembly 2 are arranged at an interval in the X direction. A distance of the interval described above may be half of a distance from the material incoming point to the imaging region. When the rack 21 retreats for a distance of an interval, and advances again, two detected objects 4 may be led to move forward at one time, so that the conveying efficiency of the detected object 4 is improved.

It may be understood that when there are multiple material incomings of the detected objects at one time, a plurality of turning heads 23 may be adaptively arranged in the X direction, so as to improve the conveying efficiency of the detected objects 4.

Figure 2:
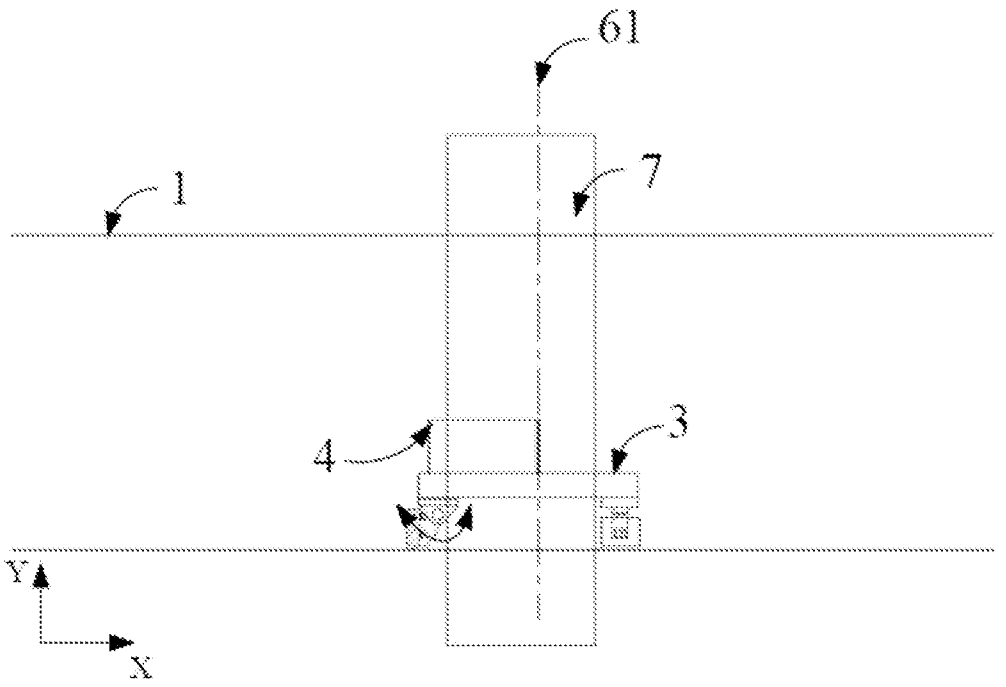
FIG. 2 schematically shows a simple diagram of an adjustment manner of a second adjustment assembly according to an embodiment of the present disclosure.
Figure 3:
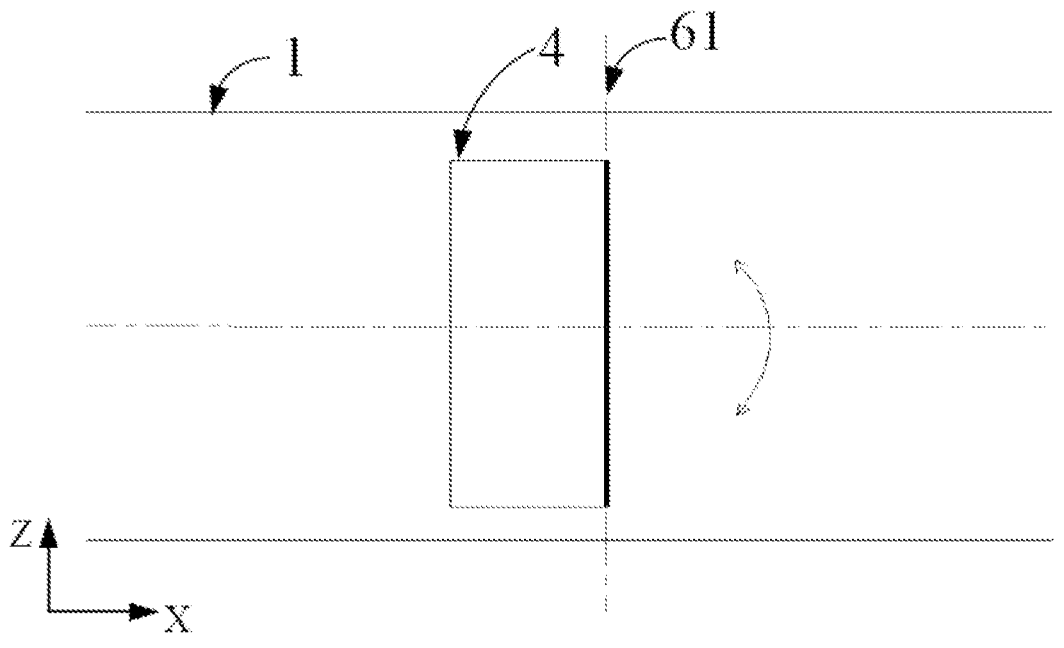
FIG. 3 schematically shows a simple diagram of an adjustment manner of a first adjustment assembly according to an embodiment of the present disclosure.

As described above, when the detected layer of the film or the adhesive layer (the detection surface parallel to the main beam plane) is deviated in the Z direction, due to the influence of the shape of the imaging region, there may be situation that the detected layer is deviated out of the imaging region. On this basis, in the embodiments of the present disclosure, there is further provided a second adjustment assembly 3. After a deviate correction of the detected object 4 in the Y direction is completed on the first adjustment assembly 2, the detected object 4 enters into the second adjustment assembly 3 under a push of the turning head 23. FIG. 2 schematically shows a process of adjusting a deviate of the detected object 4 in the Z direction by the second adjustment assembly 3. An adjustment direction is indicated by a two-way arrow in FIG. 2.

Figure 11:
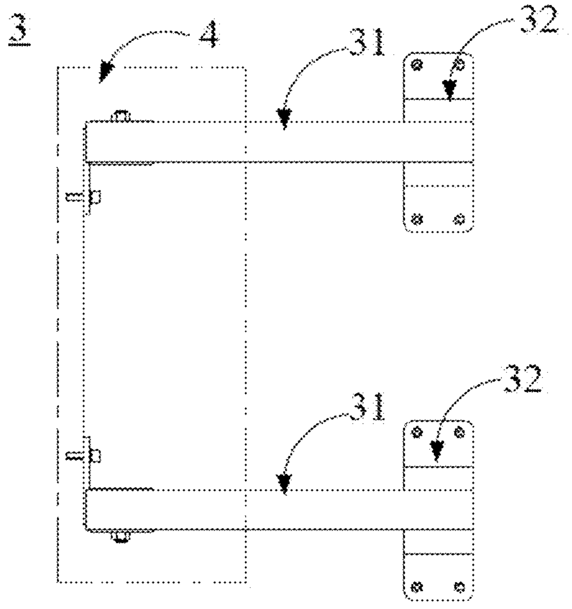
FIG. 11 schematically shows a top view of a second adjustment assembly according to an embodiment of the present disclosure.
Figure 12:
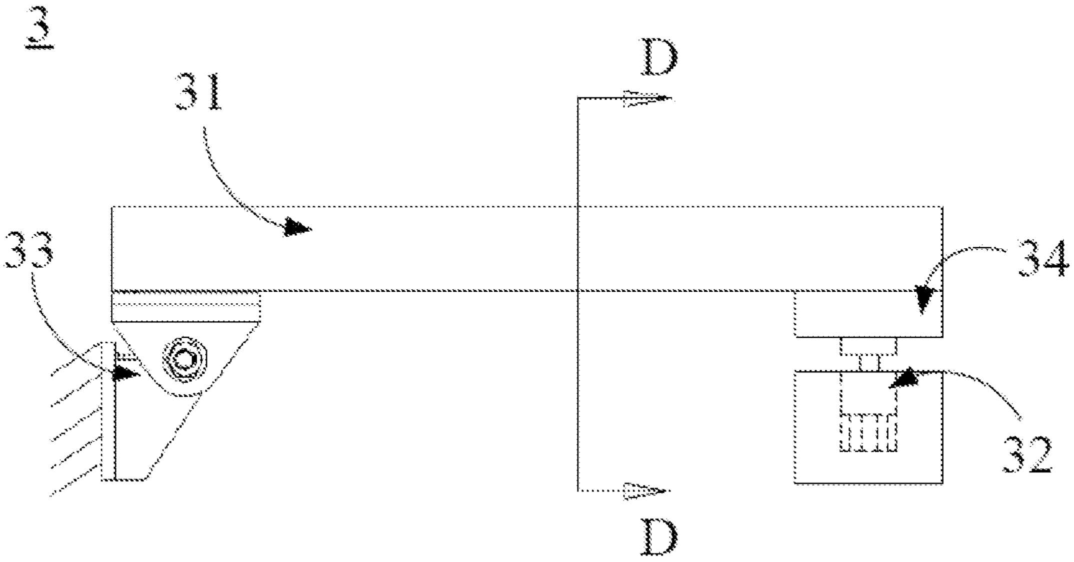
FIG. 12 schematically shows a front view of a second adjustment assembly according to an embodiment of the present disclosure.
Figure 13:
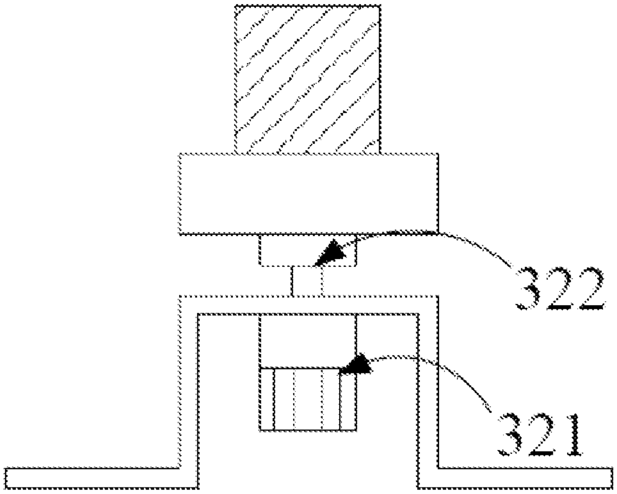
FIG. 13 schematically shows a cross-sectional view at D-D in FIG. 12.

FIG. 11 to FIG. 13 schematically illustrates the specific structure of the second adjustment assembly 3.

The second adjustment assembly 3 is arranged on the base body 1. The second adjustment assembly includes: a supporting plate 31, rotatably arranged on the base body 1 with the Z axis as a rotation axis and configured to bear the detected object thereon. In the embodiments of the present disclosure, the supporting plate 31 is a supporting beam structure. In order to achieve a stable support to the detected object 4, there are two supporting plates 31 respectively provided on the base body 1 in a hinged manner. Hinge seats 33 are respectively arranged on the horizontal supporting arms of two frame bodies 12 of the base body 1 correspondingly, so as to achieve a connection with the supporting plate 31.

Figure 15:
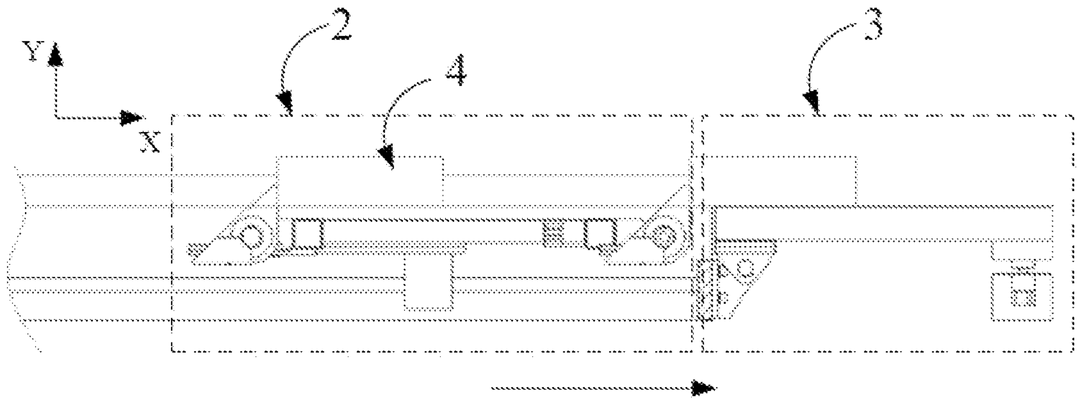
FIG. 15 schematically shows a front view of an attitude adjustment structure according to an embodiment of the present disclosure.
Figure 16:
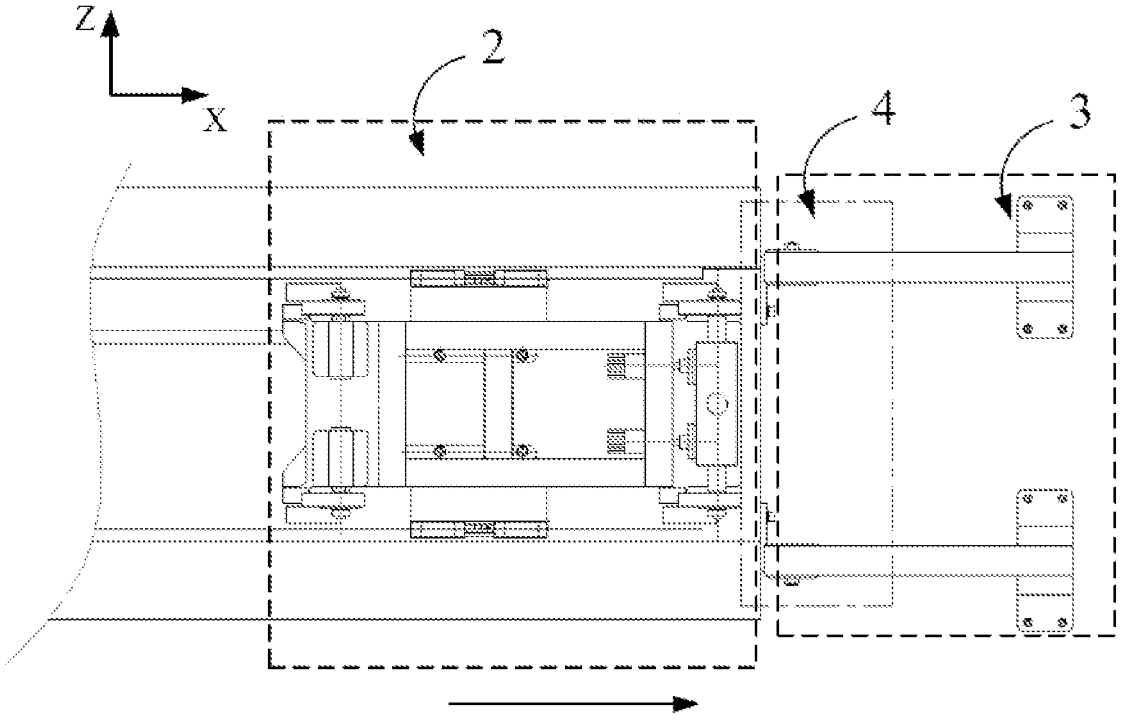
FIG. 16 schematically shows a top view of an attitude adjustment structure according to an embodiment of the present disclosure.

Referring to FIG. 15 and FIG. 16, an end of the supporting plate 31 close to the first adjustment assembly 2 is hinged on the base body 1. Moreover, in order to ensure that the detected object 4 moves smoothly from the first adjustment assembly 2 to the second adjustment assembly 3, it may be controlled that in the Y direction, a height of the bearing surface 11 is higher than an upper surface of the supporting plate 31.

As shown in FIG. 12, in order to drive a rotation of the supporting plate 31, the second adjustment assembly 3 further includes: a second driving unit 32, wherein the second driving unit 32 is arranged on the base body 1 and disposed below the supporting plate 31 away from a hinged end to drive the supporting plate 31 to rotate.

As shown in FIG. 13, the second drive unit 32 includes: a second motor 321, arranged on the base body 1; and a lifting rod 322, arranged on a motor shaft of the second motor 321, and an end of the lifting rod is connected to the supporting plate 31. The second motor 321 leads the lifting rod 322 to rotate through a shaft coupling. An end of the lifting rod 322 is connected to a joint 34 arranged on a lower end surface of the supporting plate 31, and the lifting rod 322 may be screwed on the joint 34. With a reversible rotation of the second motor 321, a reversible rotation of the lifting rod may be achieved, so that the supporting plate 322 is led to rotate clockwise or counterclockwise around a hinge axis.

It may be understood that the driving form of the second driving unit 32 may be various, and in some embodiments, common pushing rod motor driving, cylinder telescopic driving and the like are used.

As shown in FIG. 15 and FIG. 16, a movement process of the detected object 4 in the attitude adjustment structure of the present disclosure is schematically illustrated. The detected object 4 placed on the bearing surface 11 is led by the turning head 23 under an action of the turning lever 22 of the first adjustment assembly 2 to complete a deviating adjustment in the Y direction. Then the detected object 4 is led by the rack 21 under a push of the turning head 23 to complete a movement in the X direction and enters the second adjustment assembly 3. Under a driving of the supporting plate 31 in the second adjustment assembly 3, the detected object 4 completes a deviating adjustment in the Z direction. Then the detected object 4 completes an attitude adjustment, and enters the next step for a radiation imaging process.

It should be noted here that the rays in a radiation imaging are prone to attenuation when passing through a metal object, and therefore structures such as the supporting plate 31 in the second adjustment assembly 3 in the present embodiment are preferably made of carbon fiber materials.

It should be noted that the inventors found in the actual production that the rigidity of the supporting plate 31 made of carbon fiber is ordinary, and after multiple times of uses, the supporting plate 31 is prone to a bending deformation. When different types of detected objects are placed on the supporting plate 31, affected by weight changes of the detected objects 4, degrees of bending deformation of the supporting plate 31 are different, and a rotation angle of the supporting plate 31 needs to be adjusted every time. This increases the operation processes. On this basis, an implementation manner of another second adjusting assembly 3 is provided in the present disclosure.

Figure 14:
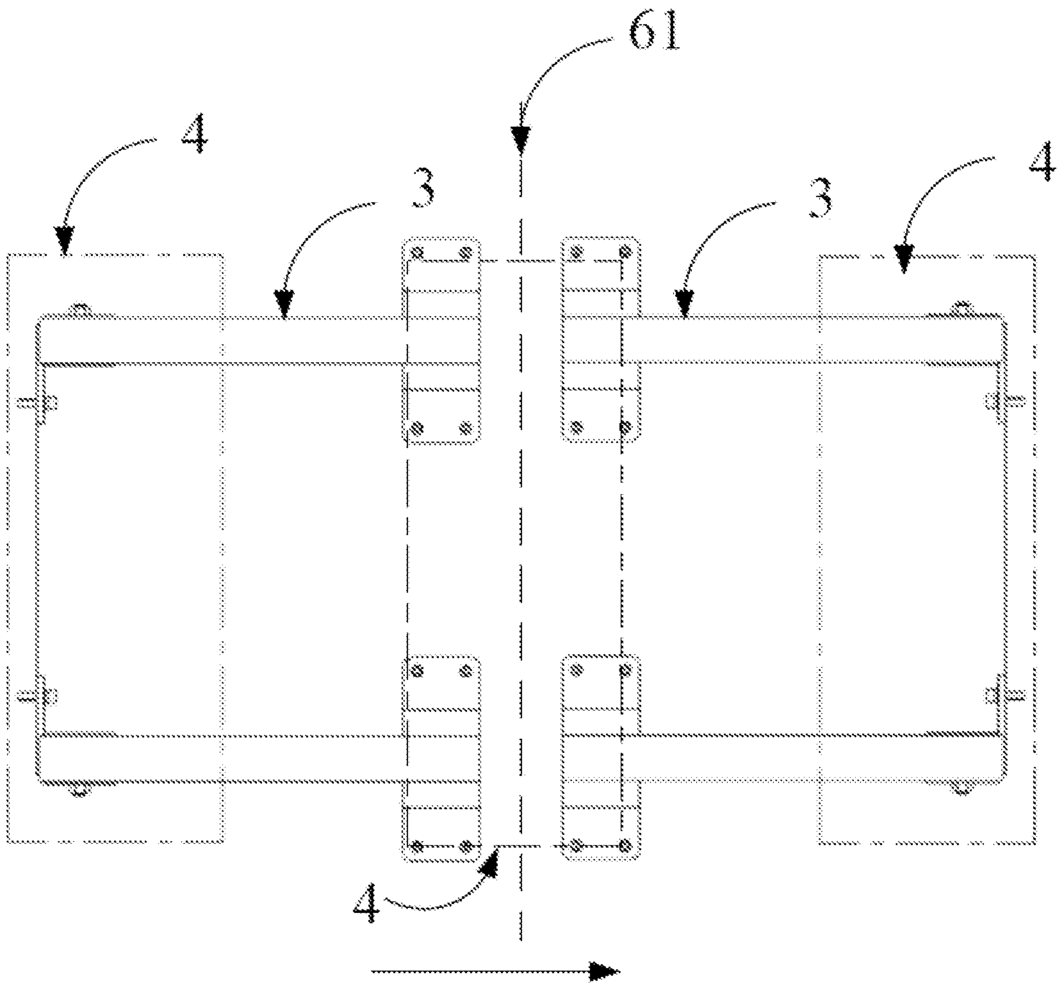
FIG. 14 schematically shows a top view of another implementation manner of a second adjustment assembly according to an embodiment of the present disclosure.

As shown in FIG. 14, two sets of second adjustment assemblies 3 shown in FIG. 11 to FIG. 13 are used in this solution. In the X direction, the two sets of second adjustment assemblies 3 are arranged at intervals. When a radiation imaging is performed, imaging regions of the radiation imaging are just within interval regions arranged at intervals. Such setting ensures that no attenuation of rays will occur when the supporting plate 31 is made of a metal having a better rigidity.

The first adjustment assembly in the present disclosure achieves a deviating adjustment of the detected object in the Y direction, and may push the detected object to move in the X direction; and the second adjustment assembly achieves a deviating adjustment of the detected object in the Z direction. Under actions of the first adjustment assembly and the second adjustment assembly, the detected object may be adjusted to a state suitable for a detection. When the attitude adjustment structure in the present disclosure is used in the radiation imaging system for a film or an adhesive layer detection as introduced in the background technology, by a deviating adjustment of the detected object, it may be ensured that the main beam surface of the light beam generated by the ray machine is parallel to the detected layer surface of the detected object, so that the accuracy of detection is guaranteed.

A conveying device is further provided in the embodiments of the present disclosure. The conveying device includes the attitude adjustment structure in the above embodiments. In the X direction, the conveying device may at least include a first section and a second section arranged at a front end and a rear end of the attitude adjustment structure. The first section of the conveying device is responsible for conveying an object 4 to be detected to the bearing surface 11 of the base body 1, and the second section thereof is responsible for conveying the detected object 4 on the second adjustment assembly 3 to a subsequent process after a radiation imaging process is completed. Belt conveyors, roller conveyors, etc. may be used as the first section of the conveying device and the second section of the conveying device.

A radiation imaging system is further provided in the embodiments of the present disclosure, specifically a CT imaging system. Of course, the present device is also applicable to a DR imaging system. The radiation imaging system includes the conveying device described above and a scanning device. The scanning device is arranged on two sides of the second adjustment assembly 3. After the detected object 4 is adjusted to a preset detection position by the attitude adjustment structure, a ray machine in the scanning device emits X-rays towards the detected object 4, the X-rays pass through the detected object 4 and are received by a detector located at the other end of the detected object 4 to complete scanning and imaging. An image reconstruction is completed by processing scanned data, and a reconstructed image is displayed to an inspector for a judgment of a detection result of the detected object 4.

The flowcharts and block diagrams in the accompanying drawings illustrate achievable architectures, functions, and operations of systems, methods and computer program products according to various embodiments of the present disclosure. In this regard, each block in a flowchart or block diagram may represent a module, a program segment, or a portion of codes, and the above module, program segment, or portion of codes includes one or more executable instructions for implementing specified logical functions. It should also be noted that, in some alternative implementations, functions noted in the blocks may occur in a sequence different from the sequence noted in the figures. For example, two blocks shown in a successive manner may be actually executed in a substantially concurrent manner, or they may sometimes be executed in a reverse sequence, depending on functions involved. It should also be noted that each block in a block diagram or flowchart, and a combination of blocks in the block diagram or flowchart, may be implemented by a dedicated hardware-based system that performs specified functions or operations, or may be implemented by a combination of dedicated hardware and computer instructions.

Those skilled in the art may understand that various combinations and/or collaborations may be made to various embodiments and/or features recited in the claims of the present disclosure, even if such combinations or collaborations are not explicitly recited in the present disclosure. In particular, without departing from the spirit and teaching of the present disclosure, various combinations and/or collaborations may be made to various embodiments and/or features recited in the claims of the present disclosure. All such combinations and/or collaborations fall within the scope of the present disclosure.

The embodiments of the present disclosure have been described above. However, these examples are for illustrative purposes only and are not intended to limit the scope of the present disclosure. Although various embodiments have been described separately above, this does not mean that the measurements in various embodiments may not be advantageously used in combination. The scope of the present disclosure is defined by the appended claims and the equivalents thereof. Various substitutions and modifications may be made by those skilled in the art without departing from the scope of the present disclosure, and these substitutions and modifications should all fall within the scope of the present disclosure.

What is claimed is:

1. An attitude adjustment structure, applied in a radiation imaging system, comprising:

a base body, arranged in an X direction, the base body having a bearing surface, and the bearing surface being configured to place a detected object;

a first adjustment assembly, arranged on the base body, and configured to drive the detected object to deviate around a Y direction on the bearing surface and drive the detected object to move in the X direction; and at least one second adjustment assembly, arranged on the base body and configured to drive the detected object to rotate around a Z direction, wherein the first adjustment assembly and the at least one second adjustment assembly are configured to perform a deviating adjustment on the detected object, so that a main beam surface of a light beam generated by a ray machine in the radiation imaging system is parallel to a detected layer surface of the detected object.

2. The attitude adjustment structure according to claim 1, wherein the detected object is conveyed to the second adjustment assembly under a driving of the first adjustment assembly, and wherein the second adjustment assembly comprises:

a supporting plate, rotatably arranged on the base body with the Z axis as a rotation axis and configured to bear the detected object.

3. The attitude adjustment structure according to claim 2, wherein an end of the supporting plate close to the first adjustment assembly is hinged on the base body, and the second adjustment assembly further comprises:

a second driving unit, arranged on the base body and disposed below the supporting plate away from a hinged end to drive the supporting plate to rotate.

4. The attitude adjustment structure according to claim 3, wherein the second driving unit comprises:

a second motor, arranged on the base body; and a lifting rod, arranged on a motor shaft of the second motor and an end of the lifting rod being connected to the supporting plate.

5. The attitude adjustment structure according to claim 2, wherein two second adjustment assemblies are arranged in the X direction at an interval, and the light beam passes through a middle of the interval.

6. A conveying device, comprising:

the attitude adjustment structure according to claim 1.

7. A radiation imaging system, comprising:

the conveying device according to claim 6, and a scanning device, arranged on two sides of a second adjustment assembly and configured to scan a detected object placed on the second adjustment assembly.

8. The attitude adjustment structure according to claim 1, wherein the first adjustment assembly comprises:

a rack, slidable in the X direction relative to the base body; and a rotating member, rotatably arranged on the rack with the Y axis as a rotation axis, and configured to drive the detected object to deviate around the Y direction on the bearing surface under a driving of an external force and drive the detected object to move in the X direction under a leading of the rack.

9. The attitude adjustment structure according to claim 8, wherein a sliding rail-sliding block structure is arranged between the rack and the base body.

10. The attitude adjustment structure according to claim 8, wherein the rotating member comprises:

a turning lever, rotatably arranged on the rack with the Y axis as a rotation axis; and a turning head, arranged on the turning lever and allowed to abut against the detected object under a driving of a driving rod.

11. The attitude adjustment structure according to claim 10, wherein the rack is provided with a rotating shaft protruding in the Y direction, and the first adjustment assembly further comprises:

an adapter block rotatably arranged on the rotating shaft, the driving lever being fixed on the adapter block.

12. The attitude adjustment structure according to claim 11, wherein the first adjustment assembly further comprises:

at least one first driving unit, arranged on the rack, the first driving unit having a pushing rod movable toward or away from the adapter block, wherein the pushing rod is movably connected to an end of the adapter block away from the rotating shaft.

13. The attitude adjustment structure according to claim 12, wherein the first driving unit further comprises:

a first motor, arranged on the rack, an end of the pushing rod is connected to a motor shaft of the first motor;

wherein an end of the pushing rod close to the adapter block is provided with a threaded section, and the adapter block is provided with a thread sleeve matched with the threaded section.

14. The attitude adjustment structure according to claim 10, wherein the turning head is rotatably arranged on the turning lever and is configured as an eccentric structure, wherein, the turning head has a first position protruding from the bearing surface under a driving of an eccentric force and a second position turned below the bearing surface under an action of an external force; and when the rack moves in the X direction, the turning head at the first position is configured to push the detected object to move in the X direction.

15. The attitude adjustment structure according to claim 14, wherein the turning head has:

a pushing surface configured to abut against the detected object;

a guiding surface, arranged at an angle to the pushing surface and configured to receive an external force;

a limiting structure, configured to limit a rotation of the turning heat when the turning head moves to the first position; wherein, when the rack moves in a negative direction of the X axis, the guiding surface is configured to hit the detected object to drive the turning head to move to the second position.

16. The attitude adjustment structure according to claim 14, further comprising:

a balancing weight, arranged on the turning head and configured to adjust an eccentric distance of the turning head, so that the pushing surface is parallel to a YZ plane at the first position.

17. The attitude adjustment structure according to claim 14, wherein in the X direction, the turning head is rotatably arranged on the rack, and the turning head is arranged at intervals, so as to push the detected object on the base body to move toward a detection region.

* * * * *